Sept. 15, 1936.   E. ALMDALE   2,054,187
GROMMET AND METHOD OF ATTACHING SAME TO METAL PLATES
Filed April 26, 1935
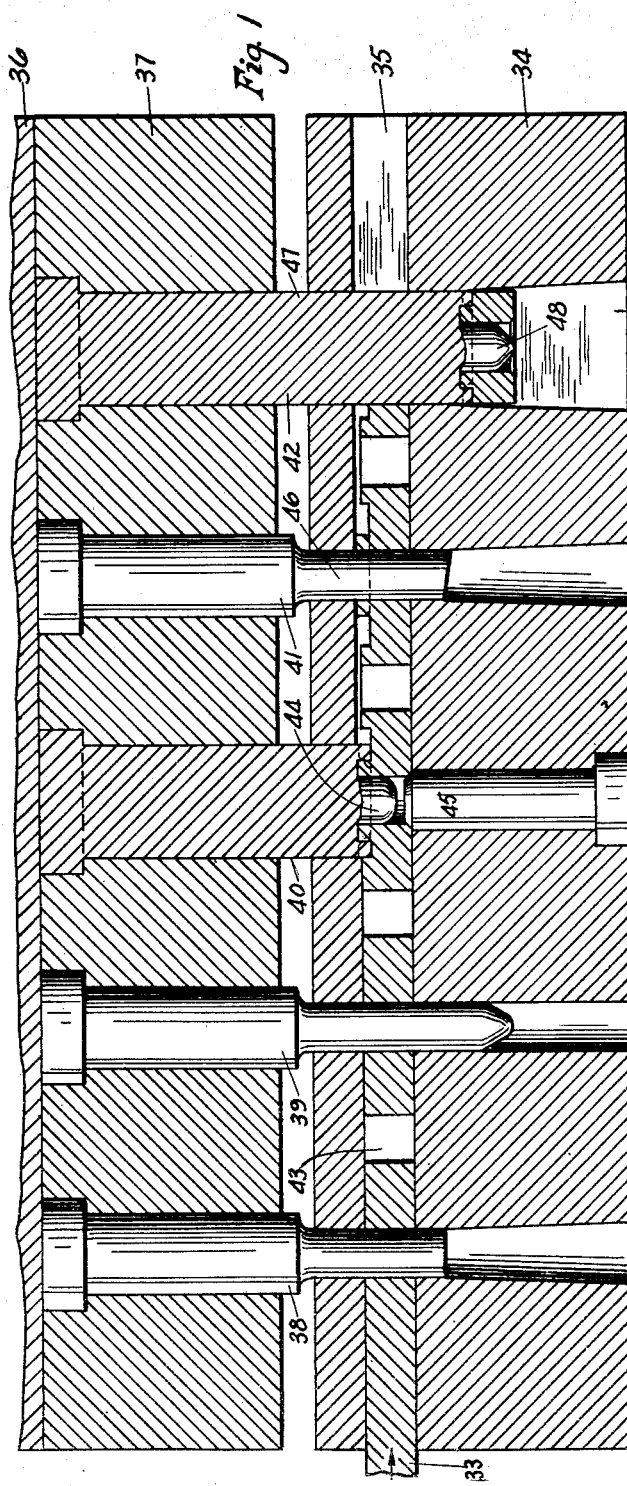
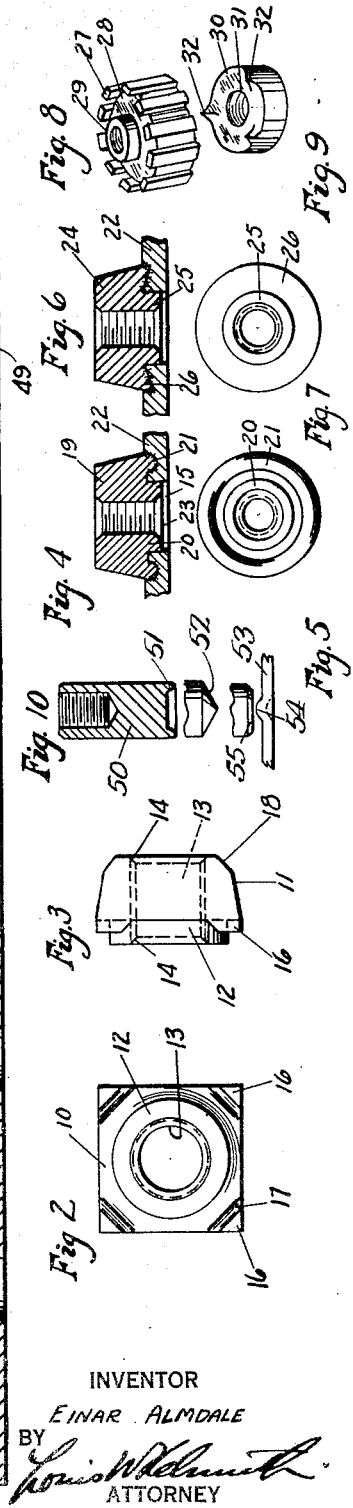
INVENTOR
EINAR ALMDALE
BY
ATTORNEY Patented Sept. 15, 1936

2,054,187

UNITED STATES PATENT OFFICE 2,054,187

GROMMET AND METHOD OF ATTACHING SAME TO METAL PLATES

Einar Almdale, Detroit, Mich., assignor to The Midland Steel Products Company, Cleveland, Ohio, a corporation of Ohio Application April 26, 1935, Serial No. 18,410

9 Claims. (Cl. 219—10)

This invention relates to grommets and clinch nuts; the method of manufacturing the same and attaching them to metal plates whereby parts may be secured to said metal plates to which the grommets or nuts are attached, and in its more limited aspects, is applicable to securing parts such as spring hangers, body parts and other adjuncts to light gauge side sills of automobile frames.
An important object of the invention is to provide improved grommets or bosses for projection-welding to metal plates and the method by which these grommets can be rapidly and cheaply manufactured from bar stock and rapidly and easily welded to metal plates.

Other objects and advantages of the invention will become apparent during the course of the following description.

In the accompanying drawing forming a part of the description and wherein like numerals are employed to designate like parts throughout the several views, Fig. 1 is a longitudinal section through the apparatus for manufacturing the grommets or bosses, Fig. 2 is a bottom plan of one form of grommet produced in the apparatus of Fig. 1, Fig. 3 is a side elevation of this grommet, Fig. 4 is a section of a modified form of grommet shown applied to a metal plate, Fig. 5 is a bottom elevation of this modified form of grommet, Fig. 6 is a section of another modification grommet shown attached to a plate, Fig. 7 is a bottom elevation of this modified form of grommet, Fig. 8 is a perspective view of a further modified form of grommet, Fig. 9 is a perspective view of another modification, Fig. 10 is a central longitudinal section of a post with various forms of bases.

The grommet or nut shown in Figs. 2 and 3 is produced in the apparatus shown in Fig. 1. This grommet 10 has a head or body portion of any desired shape, here shown as being polygonal or square. This head has its sides 11 tapered as shown in Fig. 3, the smaller section being outermost from a plate to which it is to be attached.
The base or lower face of the nut is provided with an integral centrally disposed circular pilot which has a central threaded opening 13 extending axially therethrough as well as through the head or body of the boss. The ends of this threaded opening 13 are counter-sunk as at 14 to facilitate assembly of parts therewith. The pilot 12 is preferably of a height less than the thickness of a metal plate or part to which it is to be attached as shown in the modification in Figs. 4 and 6. The pilot may, if desired, be of such dimensions as to cause its outer end to be flush with the metal plate after the boss has been welded to the plate around the perforation 15 therein.

To facilitate projection welding of the nut to a plate, the base of the head at the corners thereof is provided with integral triangular projections 16 which are not as tall as the pilot 12, but are only of sufficient height whereby they will be almost completely fused or melted into the metal of the plate when welding current is passed therethrough whereby the base of the head will be flush upon the outer surface of the metal plate. The bases of these triangular projections 16 are tapered as at 17 to merge into the base of the head as illustrated. The tapering of the sides of the nut as at 11 insures firm electrical contact between the head of the nut and a tapered pocket in a resistance welding die by which the nut is resistance welded to the metal plate and the shortest path of travel of current from contact to contact through the projections is assured.

A particular cooperation exists between the pilot 12 and the welding projections 16, especially during the welding operation. When the nut is positioned on the plate 22 with its pilot 12 or 20 closely fitting the opening 15 in the plate, the pilot is of such length that it does not project entirely through the perforation 15 and is therefore disposed out of contact with the welding electrode engaging the underside of the plate so that the welding current must first flow through the plate and then into the nut with which the other electrode engages. This assures proper flow of current throughout the welding operation through the plate as well as the nut even as the nut is moved further toward the plate under welding pressure as the welding projections 16 are fused and forced to co-mingle with the fused metal of the plate surrounding the perforation and pilot. This flowing of the fused metal would obviously cause the edges of the perforation to flow inwardly toward the center of the perforation to distort such edges were it not for the pilot 12 acting as a barrier to prevent this distortion of the perforation. Therefore, the effect of the fusing of the welding projections to the metal plate under pressure is to cause the edges of the perforation to more firmly grip the pilot 12, at the same time preventing distortion of the aperture so that subsequently fastening elements such as screws may be readily passed through the perforation in the plate and fixedly secured to the nut. Additionally the pilot increases the effective thickness of the plate to which it is attached and renders it possible to achieve the minimum effective engagement requirements between the nut and bolt irrespective of the thinness of the plate carrying the nut.

The outer corners of the head may be formed with bevels 18 and the pressure employed in so forming the corners may flow the metal of the head to entirely form the triangular projections 16, or to cause them to extend further.

In Figs. 4 and 5 the grommet or nut 19 is circular or polygonal and is provided with the same form of integral pilot as described for the preceding modification. The welding projections assume the form of an annular welding rib 21 concentric with the pilot and spaced therefrom as illustrated in order that the nut will form a liquid or air tight seal with the plate or part to which it is connected. This annular rib is adapted to be fused into the metallic plate to which it is united so as to cause the head to lie flush with the metal plate 22 and the pilot fitting the perforation 23 therein. In fusing these projections or ribs to the metal plate, the metal of the plate contacting the rib is also melted and fused so as to become substantially integrated with the nut or grommet.

In Figs. 6 and 7 another modified grommet 24 is illustrated and like that in Fig. 4 is circular but may be of polygonal section so that after it is welded to the metal part, the latter may be turned with a wrench gripping the grommet. In this modification, the axial integral pilot 25 like the preceding form is surrounded with an annular rib 26 chamfered at an angle of approximately 45 degrees to meet the base and cause the rib to terminate in a V-shaped edge which is fused into the metal plate 22 surrounding the perforation 23 therein. In these two modifications shown in Figs. 4 to 7 inclusive, the annular welding rib provides for securing the grommet or nut to a metallic plate in air or water-tight fashion.

The form of grommet shown in Fig. 8 may be produced from a circular section nut with longitudinal serrations on its periphery and having one end counter-bored to leave the ribs 27 provided by the serrations, with their ends projecting beyond the inner face 28 of the nut. An integral axial pilot 29 located centrally is provided on the base as illustrated. The projecting ends of the ribs thereby form welding projections which are fused to the metallic plate as in the preceding modifications.

In Fig. 9 the grommet is shown in the form of a circular slug or disc 30 having a central threaded opening 31 therethrough and surrounded by triangular projections 32 from the base positioned about 120 degrees apart. These three projections 32 are developed by grinding notches in the outer periphery of a blanking punch which punches out the circular slug at the same time a center hole is pierced. This form of boss or grommet is welded to a metallic plate by fusing the projections 33 into the fused metal of the plate to which it is attached to cause the base of the boss or grommet to be perfectly flush with the metallic plate, or slightly countersunk therein depending upon the amount of pressure exerted during the welding operation. This same condition may be made to exist in attaching any of the modified forms of invention herein shown to the metallic plates.

The form of grommet or boss shown in Figs. 2 and 3 may be formed with screw machines, or it may be manufactured with the apparatus shown in Fig. 1. In case it is desired to form the grommet or clinch nuts 10 in the apparatus herein shown, a bar or sheet 33 of suitable metal stock is provided having a width equal to that of the nut. This bar of stock is preferably fed in successive steps across a die 34 secured to the bed of a reciprocatory press and through a long longitudinal passage 35 therein of proper dimensions to slidably receive the bar stock. Any suitable mechanism can be employed for automatically feeding the bar stock step by step across the press or this may be accomplished manually.

The reciprocating part 36 of the punch press is provided with a plurality of sockets to receive the various tools for successively operating on the stock and these tools may be clamped against the reciprocating part of the punch press by a suitable clamping member 37 fastened to the ram by bolts or other suitable means not illustrated.

The tools 38, 39, 40, 41, and 42 fastened in the reciprocating part of the press are arranged so that a nut is produced upon each reciprocation of the press, after the bar stock has been successively fed therethrough to receive all necessary operations thereon up to the last cutoff tool 42. The end of the bar stock 33 is first fed into the press a sufficient distance so that the punch 38 will perforate a hole in the bar stock a sufficient distance from the end to form the end of the bar stock into the first nut to be produced therefrom. Upon elevation of the reciprocating part of the press, the bar stock is moved another step or two depending upon the spacing of the tools, so as to bring the perforation 43 into alignment with the pilot 39 so that the latter enters the perforation upon the next descent of the reciprocating part of the press. The next successive feeding step of the bar stock through the press causes the first formed perforation 43 to be aligned with the pilot 44 of a coining tool 40, which upon the next stroke of the press, provides the projections 16 and pilot 12 with the countersink 14 in the end of the boss, and simultaneously therewith, the countersink 14 at the opposite end of the opening 13 by means of a countersink tool 45. After completion of the coining operation and upon elevation of the reciprocating member of the press, the bar stock is fed a step further, wherein the first formed perforation 43 is aligned with a cutting tool 46 to shave and clean up the hole 43 upon the next stroke of the press. Upon the upstroke of the reciprocating tool holder, the bar stock is successively fed through the passage 35 to bring the end of the bar stock in position under the cutoff 47 and with the perforation 43 aligned with the pilot 48 of the cutoff so that upon the next downstroke of the press the end of the bar stock is cut off to form the first clinch nut, whereby thereafter and upon each stroke of the press, a nut is formed and ejected through the passage 49 into a suitable hopper.

Of course the other forms of grommets or nuts than illustrated herein may be formed with the same apparatus by simply providing different tools to form the appropriate shape of boss and welding projections. It will also be understood that the invention also comprehends other forms of the devices than those herein specifically illustrated. For example, I consider it within the scope of the claims, to form the bases of posts or tubular members with welding projections, such as disclosed herein and in Fig. 10 is shown such a form of post or boss 50 with an annular projection 51 on the base thereof for resistance welding to a plate. The numeral 52 indicates a pointed axially disposed welding projection which may be formed at the end of post 50. At the bottom of Fig. 10, a metal plate 53 is illustrated with a projection 54 pressed up to be resistance welded to a flat base 55 of a post or to one having a cavity to receive the projection.

It is to be understood that various changes in the steps of the method and the shape and arrangement of various parts of the grommets or nuts may be resorted to without departing from the spirit of the invention or the scope of the appended claims.

I claim:

1. A joint between a thin perforated metal plate and a nut by which a part is mounted on said plate, said nut having an internally threaded pilot disposed in said perforation and a plurality of spaced welding projections fused with the metal of said plate to rigidly connect the nut to the plate, the pilot being of less depth than the thickness of the plate.

2. A joint between a perforated metal plate and a nut by which a part is mounted on said plate, said nut having an internally threaded pilot disposed in said perforation and an annular projection surrounding said pilot and fused with the metal of said plate to form a gas and liquid seal between said nut and plate, said pilot being of less depth than the thickness of the plate.

3. A joint between a thin perforated metal plate and a polygonal nut by which a part is mounted on said plate, said nut having a hollow pilot disposed in said perforation, and a projection at each corner of the nut extending in the same direction as the pilot, said projections being fused with the metal of said plate to rigidly connect the nut to the plate, and said pilot being of less depth than the thickness of the plate.

4. The method of securing a tapped nut to a perforated metal plate, which comprises forming a nut with a tubular pilot projecting from its base and a welding projection extending in the same direction as the pilot, inserting the pilot of the nut into the perforation in said plate without extending entirely through the same and with the welding projection engaging the plate, and fusing the welding projection with the metal of said plate to cause the base of the nut to closely engage the plate around said perforation and the end of the pilot being disposed entirely within the perforation.

5. A boss for connection with a thin perforated metal member to facilitate connecting other members thereto, comprising a head having an integral axial pilot extending therefrom to fit in a perforation of said metal member, said head and pilot being perforated to form a cylindrical opening to receive a connecting member, and an integral welding projection extending from said head in the same direction as the pilot to be resistance welded to the perforated metal member.

6. A nut for connection with a thin perforated metal member to facilitate connecting other members thereto comprising a head having an integral axial pilot extending therefrom to fit in a perforation of said metal member, said head and pilot being perforated to form a cylindrical opening to receive a connecting member, and said head having integral substantially triangular shaped welding projections of lesser height than the pilot spaced equi-distantly around the shank and extending in the same direction as said pilot to be fused with the perforated metal member around said perforation.

7. A nut for connection with a thin perforated metal member to facilitate connecting other members thereto, comprising a head having an integral axial pilot to fit in a perforation of said metal member, said head and pilot being perforated to form a cylindrical opening to receive a connecting member, and said head having an integral annular welding rib concentric with the pilot and extending in the same direction thereof to be resistance welded to the perforated metal member around said perforation to form a gas and liquid tight seal between the nut and member.

8. As an article of manufacture, a nut comprising a body having an integral axial pilot, said body and pilot having an interiorly threaded opening, said body having integral substantially triangular shaped welding projections of less height than the boss at each corner of the nut, said projections extending from the body of the nut in the same general direction as the pilot, two sides of each triangular projection being formed as continuations of adjacent side walls of the nut, and the third side of each projection being inclined downwardly and inwardly toward said boss.

9. As an article of manufacture, a nut comprising a body having an integral axial tubular pilot extending from one face of the body, said body and pilot being interiorly screw threaded, and said body having integral welding projections of less height than the pilot at each corner of the nut and extending in the same direction as the pilot.

EINAR ALMDALE.